J. WIELAERT.
MILKING MACHINE.
APPLICATION FILED OCT. 3, 1913.
1,223,334.
Patented Apr. 17, 1917.
4 SHEETS—SHEET 1.
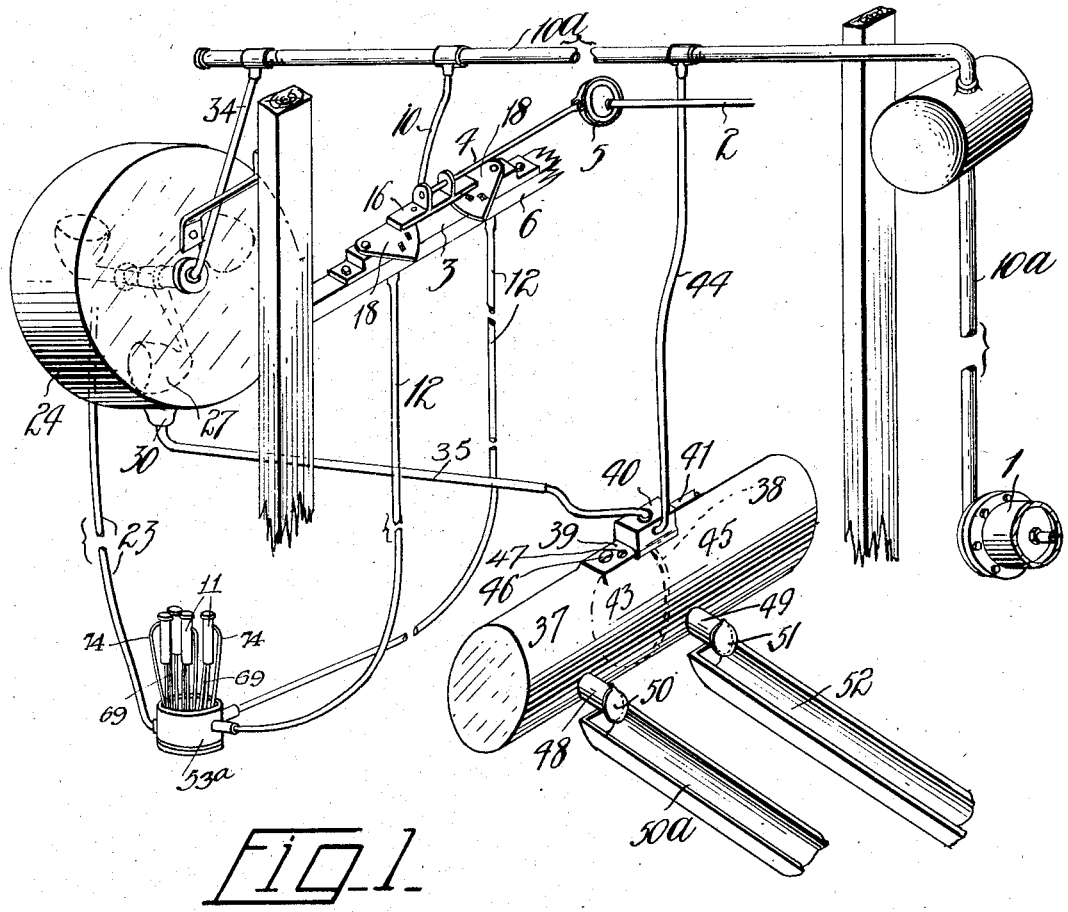
Fig. 1.
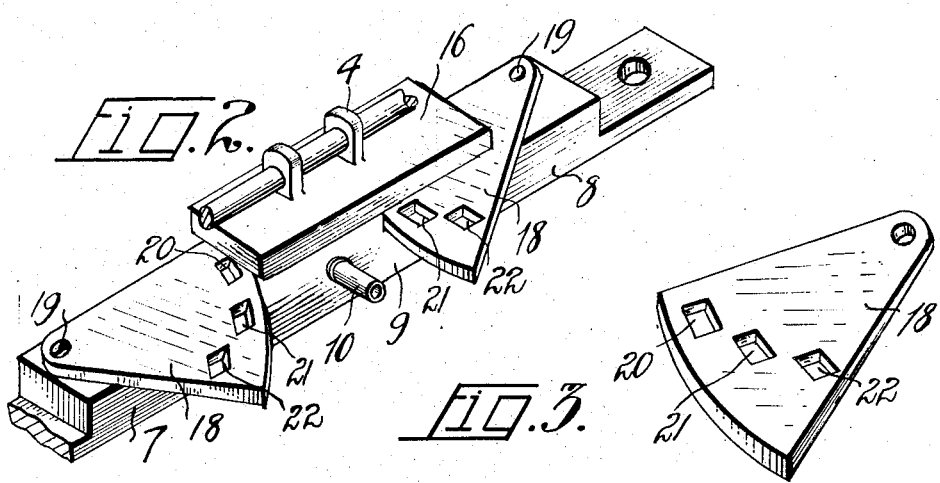
Fig. 2.
Fig. 3.
Witnesses:
M. F. Keating
Owen T. Bugg
Inventor:
Johan Wielaert
per
Charles J. Kintner
Attorney.

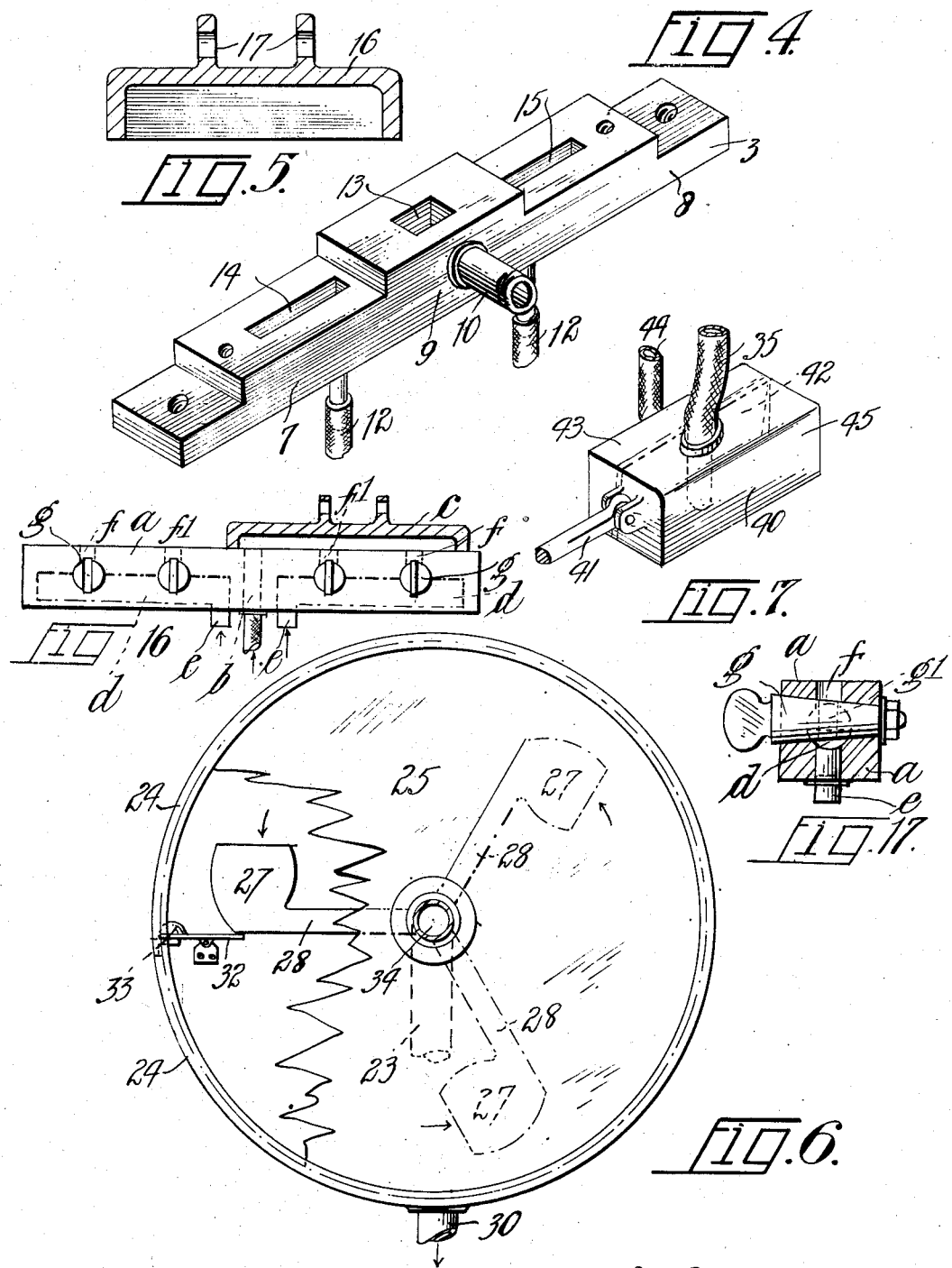

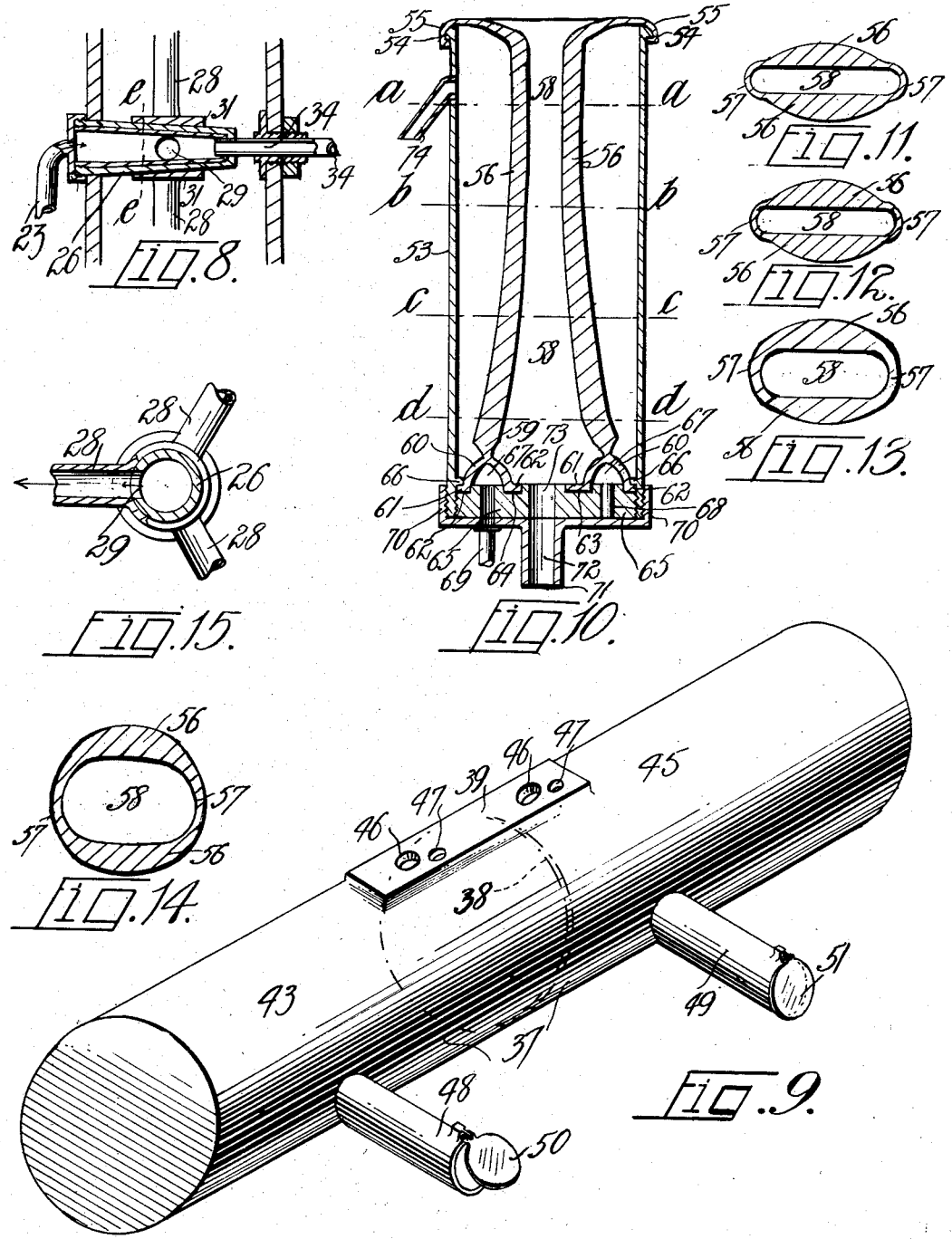

J. WIELAERT.
MILKING MACHINE.
APPLICATION FILED OCT. 3, 1913.

1,223,334.

Patented Apr. 17, 1917.
4 SHEETS—SHEET 4.

UNITED STATES PATENT OFFICE.

JOHAN WIELAERT, OF REMUERA, AUCKLAND, NEW ZEALAND, ASSIGNOR, BY MESNE ASSIGNMENTS, TO EDWARD MARSHALL CAMERON McALPINE, OF BROOKLYN, NEW YORK.

MILKING-MACHINE.

1,223,334.  Specification of Letters Patent.  Patented Apr. 17, 1917.

Application filed October 3, 1913. Serial No. 793,208.

*To all whom it may concern:*

Be it known that I, JOHAN WIELAERT, a citizen of the Dominion of New Zealand, residing at Mount Hobson Road, Remuera, Auckland, Dominion of New Zealand, have invented new and useful Improvements in Milking-Machines, of which the following is a specification.

This invention relates to an improved milking machine, and has been devised in order to provide a cheap, simple and efficient milking machine adapted to milk the cow in a much shorter time than has hitherto been possible, so causing an increased milk flow.

The essential features of the invention consist in the combination and arrangement of a suitable vacuum pump, pipe connections, a measuring device in order that the milk yield of each cow can be determined, an improved milk receiver, means for imparting an intermittent supply of air to the receiver or releaser, a pulsator and teat cups each having a flexible lining provided with an annular extension at its lower end to allow of an intermittent downward motion to the lining during the milking operation.

In order that the invention may be more readily understood, it will now be described with reference to the accompanying drawings, in which—

Figure 1 is a view in perspective of the essential features of a milking machine constructed according to this invention.

Fig. 2 is a view in perspective of the pulsator.

Fig. 3 is a view in perspective of an essential detail, embodied in the pulsator.

Fig. 4 is a view in perspective of the pulsator block, and,

Fig. 5 is a view in horizontal section of the pulsator dome.

Fig. 6 is a front elevation of the measuring device constructed according to this invention.

Fig. 7 is a view in perspective of the pulsator or intermittent gear controlling the delivery of milk to the milk receiver.

Fig. 8 is a view in vertical section of a portion of the milk weighing and measuring device.

Fig. 9 is a view in perspective of the milk receiver constructed according to this invention.

Fig. 10 is a view in vertical section of the teat cups embodied in this invention.

Fig. 11 is a horizontal section of the cup lining taken on the line $a$—$a$ Fig. 10.

Figs. 12, 13 and 14 are views similar to Fig. 11 taken on the lines $b$—$b$, $c$—$c$, and $d$—$d$ respectively.

Fig. 15 is a cross section taken on the line $e$—$e$ Fig. 8.

Fig. 16 is a sectional elevation of a modified form of pulsator, and,

Fig. 17 is a transverse section thereof illustrating details in construction.

Like reference numerals indicate the same or corresponding parts in all the figures.

Figure 18:
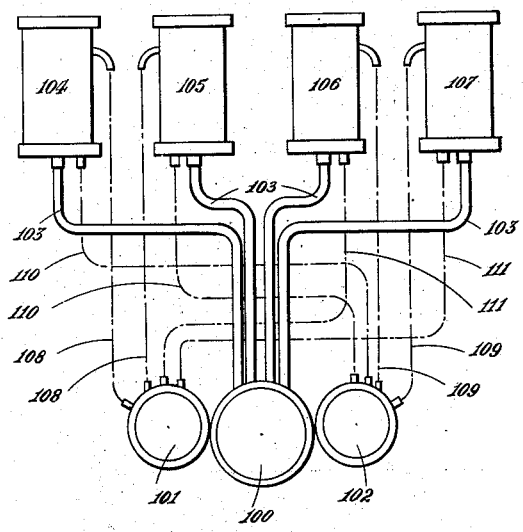
Fig. 18 shows an enlarged diagrammatic view of the claw and connections thereto.

According to this invention, a suitable vacuum pump 1 is mounted in any convenient position adapted to be operated by a suitable engine, which also imparts by means of a counter shaft 2, a reciprocating motion to the pulsator 3, the connecting rod 4 of which extends to and is connected to the strap of an eccentric 5 mounted at one end to the counter shaft 2.

The pulsator 3 consists of a block or frame mounted upon a suitable bracket 6 fitted to the cow shed in any convenient position. The pulsator is divided into two compartments 7, 8, and is adapted at its center 9 to receive a connection 10 from the main vacuum supply pipe 10ª and this central portion is always under vacuum. The compartments 7, 8, are connected to the teat cups 11 by a suitable pipe connection 12, as hereinafter described in order that air may be intermittently admitted to the teat cups, thus breaking down the vacuum and causing the rubber inflation therein to produce a squeezing action upon the teat. The connection 10 leads to the orifice 13 of the central portion of the pulsator, while the pipes 12 communicate with the orifices 14 and 15 in the compartments 7, 8.

The upper face of the pulsator block is provided with orifices 13, 14, 15 formed thereon leading to the respective vacuum and air compartments 7, 8, 9, of the pulsator.

Mounted upon the vacuum compartment 9 is a suitable box or dome 16 adapted to slide upon the face of the pulsator frame. This box 16 is hollow as illustrated in Fig.

5 and is always in communication with the vacuum compartment 9 of the pulsator 3. The sliding box 16 is provided with projections or lugs 17 adapted to engage with the connecting rod 4, and, on motion being imparted thereto, the box is adapted to slide backward and forward over the surface of the pulsator frame.

The pulsator frame 3 is recessed at either end over the air compartments 7 and 8 and is provided with horizontal segments 18 pivoted at 19 within the recess and which are adapted to swing edgewise across the face of the air compartments. These segments are each provided with three slots 20, 21, 22, disposed in staggered formation so as to be adapted to be brought successively into communication with the orifices 14, 15 respectively. The upper faces of the segments 18 are flush with the face of the vacuum compartment 9, thereby presenting a smooth sliding surface for the box or dome 16.

On the end of the stroke, the box 16 is adapted to cover either one of the orifices 20, 21 or 22 of the air compartment 8, and vacuum is transmitted to the teat cups through the pipe 12. The vacuum is broken down by uncovering one or other of the orifices 20, 21 or 22 at one end of the stroke.

On the opposite end of the stroke, the box 16 is adapted to cover either one of the orifices 20, 21 or 22 of the air compartment 7 and vacuum is transmitted to another set of teat cups through the other pipe 12. On the return stroke, the vacuum is broken down by admitting air to the air chamber 7 through one or other of the orifices 20, 21, or 22 in the said air compartment to the cups 11.

This operation is carried on intermittently during milking.

Means are thus embodied whereby the dome at one end of the stroke is a longer or shorter time over the air orifice while always being over the vacuum orifice at the other end of the stroke, to produce a longer or shorter squeeze as may be required by the degree of texture or hardness of the cow's udder or teats.

This is accomplished by means of the segments 18, which, when the orifice 20 is over the orifices 14, 15, in the air compartment impart a long suck and a short squeeze to the teats. When the orifice 21 is over the chambers 7 and 8 an even suck and an even squeeze is imparted to the teats. When the orifice 22 is adjusted, a long squeeze and a short suck is imparted to the teats.

The squeeze may be varied in the modified form of construction illustrated in Figs. 16 and 17, the pulsator consisting of a block $a$ having a central vertical orifice $b$ connecting the vacuum supply. This orifice $b$ is always in communication with the sliding dome $c$. The block is divided into two air compartments $d$, each compartment communicating with the teat cups through orifices $e$. Leading vertically to the face of the pulsator block from the compartments $d$ are a plurality of spaced orifices $f$, $f^1$, the passage of air into the dome $c$ being controlled by transversely arranged plugs or taps $g$ provided with a slotted opening or port $g^1$ adapted to open or close the air passage in relation to the air compartments $d$ as desired, and it will be readily understood that when the taps controlling the orifices $f^1$ are opened a shorter squeeze and longer suck will be imparted to the teat than when the orifices $f$ are in operation.

The milk pipe 23 of the teat cups communicates with a suitable milk measuring device. This device consists of a suitable cylindrical casing 24 within which the milk supply pipe or connection terminates, the casing being preferably provided with a glass front 25.

Mounted radially around the supply pipe connection 26 are suitable filling buckets or receivers 27 connected with the pipe 23 by means of tubular connections or arms 28 provided with an orifice leading to the receptacles, while the opposite ends of the tubular connections or arms 28 are adapted, when in a horizontal position, to receive the milk through an orifice 29 in the milk pipe connection 26, the milk passing through this orifice 29 and connection 26 through the outlet pipe 30 into the bucket or receiver 27.

The inner ends of the arms 28 are fitted to a sleeve 31 adapted to rotate around the milk pipe connection 26.

The bucket 27, when filling, is adapted to rest upon a pivoted trip lever 32 fitted to the frame or casing 24 and provided at its other end with a counter-balance weight 33.

Immediately the required amount of milk is delivered into the bucket or receiver 27, it counteracts the weight 33 on the trip lever 32 and drops down, thus delivering the milk into the casing 24, the next or succeeding milk receiver 27 resting upon the trip lever 32 and being then ready for filling. The casing 24 is always in vacuum, the main vacuum pipe $10^a$ being connected to the milk tube connection 26 by a connection 34 and the milk is immediately withdrawn after being delivered from the bucket or receiver 27 into the casing 24 through the milk delivery tube 35 and thence to a suitable milk receiver consisting of a cylindrical or other suitable casing 37 provided with a partition 38 at its center.

Means such as an air motor (not shown) are adapted to impart a reciprocating motion to intermittent gear consisting of a block or plate 39 having a box or dome 40 sliding thereon pivotally connected with the air motor by means of the rod 41. This dome 40 is partitioned at 42 to form two compartments, one compartment 43 communicating with the vacuum supply pipe 44 and the other compartment 45 with the milk measuring device 24 by the pipe 35.

Should an air motor be employed, it may be mounted upon or immediately above the top of the receiver and in any suitable manner.

The block or plate 39 is provided at each end upon either side of the partition 38 with two slots 46, 47 communicating with the corresponding compartment of the receiver 37.

Delivery pipes 48, 49 project from the compartments of the milk receiver, the pipes being provided with flap valves 50, 51. These flap valves are pivoted to their respective pipes as illustrated in Fig. 9.

The dome 40 being operated over the plate 39 at one end of the stroke covers the slots 46, 47 of one compartment 43, and the milk is fed therein through the pipe 35 and slot 46. During this operation the compartment is in vacuum as it is now connected to the main vacuum supply pipe 10ª by means of the pipe 44 and the flap valve 50 is locked against the mouth of the pipe 48.

On the opposite stroke, the dome 40 covers the slots 46, 47 of the compartment 45 and a similar operation takes place while the orifices 46, 47 of the chamber 43, being free, air is admitted into the compartment breaking down the vacuum and allowing the milk to flow through the pipe 48 into the launder 50ª to the milk cans.

On the release of the vacuum in the compartment 45 the milk flows through the pipe 49 into the launder 52 as will be readily understood.

The teat cups constructed according to this invention are mounted upon a claw 53ª and consist of an outer metal casing 53 provided with a flange 54 at its upper end around which the inner flexible lining 55 is adapted to fit.

This inner flexible lining 55 is oval shaped in cross section as illustrated in Figs. 11, 12, 13 and 14, the upper portion being the narrower.

The sides 56 of the oval 55 are thick, while the ends 57 are narrower as illustrated in the said figures.

The opening 58 of the lining 55 is narrower but it gradually widens and the sides 56 become thicker at the lower end as illustrated in Fig. 14.

The lower end 59 of the lining is provided with a double annular extension 60 the two portions of which are provided with external and internal flanges 61, 62 respectively. These flanges seat within annular grooves 63, 64, formed around the upper face of a base plate 65 screwed into the lower end of the casing 63. An internal flange 66 formed upon the inner periphery of the case 1 is adapted to bear upon and hold the outer flange 62 of the annular extension 60.

The annular extension 60 is open on its underside and forms a hollow compartment 67 communicating with an annular opening or groove 68 in the base plate 65 which divides the base plate into two portions the inner portion being held in position by any suitable means.

This groove 68 communicates with a pipe 110 or 111 connected through pipe 101 or 102 and one of pipes 12 with pulsator 3. A detachable cap 70 is screw threaded to the lower end of the case 53 and the depending tube 71 thereof is provided with a central hole 72 leading to a corresponding hole 73 in the base plate 65 communicating with the inside of the teat cup lining 55, thereby allowing the milk to be drawn through the milk pipes 100 and 23 to the weighing device.

The nipple 74 provided at any convenient portion of the case 53, is connected through pipes 108, 101 or 109, 102 and one of pipes 12 to the pulsator 3 so as to allow when the vacuum is interrupted an intermittent supply of air pressure to act upon the outside of the lining 55.

During each squeezing action, the annular extension is drawn toward the base plate 65 and carries the lining with it, giving a downward motion to the teat, so causing a natural squeezing action to be imparted thereto.

Referring to Fig. 18, which shows the claw and teat-cup connections thereto, the claw comprises three chambers 100, 101, 102.

The chamber 100 communicates through the pipe-connections 103 with the chamber 58 of the teat cups 104, 105, 106, and 107.

The chamber 101 of the claw communicates through the pipe connections 108 with the chamber 56 of the teat cups 104, 105 and the chamber 102 of the claw communicates through the pipe connections 109 with the chamber 56 of the teat cups 106 and 107.

The annular chambers 67 Fig. 10 of the teat cups 104, 105, communicate with the chamber 102 of the claw, through the pipe-connections 110, and the annular chambers 67 Fig. 10 of the teat cups 106, 107, communicate through the pipe connections 111 with the chamber 101 of the claw.

The chamber 101 has no connection with the chamber 102 but communicates with the chamber 7 through the pipe connection 12 of the pulsator Fig. 5 and the chamber 102 communicates with the chamber 8 through the pipe-connection 12 of the pulsator Fig. 5 and the chamber 100 communicates by suitable pipe-connections 23 with the bucket system of the measuring and weighing device.

With a milking machine constructed and arranged on the over-head system as above described, the use of rubber tubing is diminished, the milk yield of each cow is effectually determined and the cow is milked in a far more expeditious manner than has hitherto been possible, it being readily understood that a plurality of receivers, pulsators, measuring devices and teat cups may be employed, according to the capacity of the shed.

What I do claim as my invention and desire to secure by Letters Patent, is—

1. A milking machine consisting in the combination of a vacuum pump, teat cups, a claw carrying said teat cups, a pulsator communicating with said claw and said teat cups, a milk measuring device in connection with said vacuum pump arranged above the said claw and in communication therewith, a milk receiver divided into two compartments, and comprising a plate formed upon the top of same, intermittent gear consisting of a partitioned dome or box connected with said measuring device and the vacuum supply and arranged to slide over the surface of said plate, said dome being adapted to alternately supply milk to said compartments, each compartment being held in vacuum during the flow of milk thereto, and delivery pipes fitted to the compartments having flap valves fitted to the outer ends thereof substantially as described.

2. In a milking machine, in combination with a source of milk supply and a source of vacuum, a milk receiver divided into two compartments by a partition, said compartments having delivery pipes carrying flap valves at their outer ends, a smooth surface or plate formed on said receiver at the center thereof, having slots through the same on either side of the partition and means operating on said plate for alternately placing said compartments into communication with said source of vacuum and said source of milk supply with the outside air, substantially as described.

3. In a milking machine, vacuum and milk supply pipes, a receiver divided into two compartments by a partition and having a service plate, having slots therethrough into each compartment of intermittent gear consisting of a dome or box divided into two compartments connecting with said vacuum and milk supply pipes and means for sliding the said dome over the slotted surface or plate of the receiver in such a manner that milk is alternately fed into first one and then the other compartment of the receiver during the milking operation substantially as and for the purposes specified.

4. In a milking machine teat cups a milk measuring device consisting of a casing with a transparent face and provided with an outlet opening, a milk pipe fitted centrally of said casing and communicating with the said teat cups, a vacuum pump, a pipe connection between said casing and said vacuum pump, a sleeve loosely mounted around the milk pipe within the casing, radial tubes carrying buckets or receivers projecting from said sleeve, the ends of said tubes when in a horizontal position covering an orifice in the milk pipe, and means for weighing the milk delivered to the buckets, substantially as described.

5. In a milking machine a claw, teat cups, pipe connections, a pulsator consisting of a member formed with a compartment at each end, each communicating with said claw carrying said teat cups by the said pipe connections, a chamber formed between said outer chambers connected to a vacuum supply pipe, said chambers having orifices leading to the upper surface thereof, means for regulating the pressure to suit the various teats consisting of movable slotted segmental plates adapted to cover the orifices of the outer chambers of the pulsator and a hollow member arranged to slide over the face of the pulsator for interrupting the vacuum applied to the teat cups substantially as described.

6. In a milking machine, a teat cup consisting of an outer metal casing and an inner and oval shaped flexible lining, the opening being narrower at the upper than at the lower end of the said lining, the ends of the oval being formed of comparatively thin material while the sides gradually thicken toward the lower end thereof, a double annular extension or hollow chamber formed on the lower end of the lining within the teat-cups, a base-plate, an annular groove in the base plate communicating with the said annular extension of the lining and with the vacuum supply, a removable cap having a depending tube communicating with the interior of the lining, a nipple in communication with the annular groove of the base plate and a nipple on the wall of the cup whereby an intermittent pressure is applied to the exterior surface of the lining.

7. In a milking machine, a source of vacuum supply, a teat cup, a device for controlling the vacuum supply to said teat cup, the latter having a flexible lining, a casing surrounding the same, a double annular extension at the lower end of the lining and forming a hollow compartment, a nipple projecting from the casing, means connecting said nipple with the vacuum supply controlling device and means connecting the aforesaid hollow compartment with said vacuum supply.

8. In a milking machine, pipe connections, a source of vacuum supply, a teat cup having an internal flexible lining fitted with a double annular extension at its lower end forming a chamber communicating by means of such pipe connections with said source of vacuum supply substantially as described.

9. A milking machine having a teat cup provided with an internal flexible lining having a double annular extension at its lower end, forming a hollow compartment, pipe connections, a source of vacuum supply in communication with said lining by means of such pipe connections and said hollow compartment and means whereby the vacuum is intermittently applied to said lining and compartment.

10. In a milking machine, a source of vacuum supply, a claw, teat cups carried by the claw, a pulsator comprising a block having a central chamber, a pipe connecting said central chamber with the vacuum supply, pipe connections between the pulsator and the claw, means for regulating the vacuum to the teat cups, a milk collecting and measuring device in piped communication with said claw, a milk receiver having separate compartments and ports for each compartment, a slidable dome communicating with the vacuum supply and in piped communication with said collecting and measuring device and alternately covering and uncovering the ports of each compartment.

11. In a milking machine, a pulsator divided into two air compartments and provided with a vacuum supply, a dome adapted to slide over the face of the pulsator and means adapted to control the relative movement of the dome over the orifices leading to the face of the pulsator for varying the squeeze in relation to the suck that may be imparted to the teat.

12. The combination with a milking machine comprising teat cups, means for intermittently applying a vacuum to the said teat cups and milk receiving means in communication with the said teat cups, of a milk measuring and weighting device located above the said teat cups and between the said teat cups and the said milk receiving means.

In witness whereof I affix my signature in the presence of two witnesses.

JOHAN WIELAERT.

Witnesses:
T. D'ARCY HAMILTON,
S. E. MAJOR.